United States Patent [19]

Clarkson

[11] Patent Number: 5,798,304
[45] Date of Patent: Aug. 25, 1998

[54] CAMOUFLAGE FABRIC

[76] Inventor: George Maclean Clarkson, 62 Sheriffs Park, Linlithgow, United Kingdom, EH49 7SS

[21] Appl. No.: 612,909
[22] PCT Filed: Sep. 1, 1994
[86] PCT No.: PCT/GB94/01893
§ 371 Date: May 2, 1996
§ 102(e) Date: May 2, 1996
[87] PCT Pub. No.: WO95/06850
PCT Pub. Date: Mar. 9, 1995

[30] Foreign Application Priority Data

Sep. 1, 1993 [GB] United Kingdom ............... 9318098

[51] Int. Cl.[6] .................................................. F41H 3/00
[52] U.S. Cl. ........................ 442/289; 428/913; 428/919
[58] Field of Search .................... 442/289; 428/913, 428/919

[56] References Cited

U.S. PATENT DOCUMENTS

| 3,700,397 | 10/1972 | Ramsley et al. ............... 8/4 |
| 4,095,940 | 6/1978 | Weingarten ..................... 8/15 |

FOREIGN PATENT DOCUMENTS

| 1104312 | 11/1955 | France . |
| 1232315 | 10/1960 | France . |
| 1053976 | 3/1959 | Germany . |
| 1063936 | 8/1959 | Germany . |
| 1501370 | 12/1972 | United Kingdom . |
| 1605261 | 12/1977 | United Kingdom . |
| 2001417 | 6/1978 | United Kingdom . |
| 2252399 | 8/1992 | United Kingdom . |

*Primary Examiner*—Helen L. Pezzuto
*Attorney, Agent, or Firm*—Gary A. Samuels

[57] ABSTRACT

A fabric presents a non-camouflage pattern under visible light and a camouflage pattern under infrared radiation. The fabric may appear under visible light to have a continuous solid color and thus be suitable for use in police uniforms.

13 Claims, No Drawings

CAMOUFLAGE FABRIC

FIELD OF THE INVENTION

The present invention relates to a camouflage fabric wherein the camouflage pattern is visible only under infra-red light. The camouflage pattern is not visible under visible light (i.e.light in the visible part of the electromagnetic spectrum).

BACKGROUND OF THE INVENTION

Camouflage uniforms have for many years been provided to the armed services, to enable soldiers to blend into their surroundings and so minimise their risk of being seen by an enemy. Traditional camouflage patterns aim to visually disrupt the shape of the body, so that the body outline is less easily recognised, and also to provide colours or areas of light and dark which approximate their surroundings. Traditionally, such camouflage has been aimed at being effective in the visible region of the spectrum.

However, in recent years nightsights have become available which are responsive to infra-red light. Thus, a sniper in possession of an image intensifier nightsight is able to pick out a target at night, owing to its illumination by ambient infra-red radiation. The fabrics normally employed for military or police uniforms tend to have a higher infra-red reflectance that normal surroundings (for example temperate foliage) so that such persons present readily locatable targets at night. Fabrics are available which have camouflage patterns both in the visible and infra-red regions of the spectrum. However, such materials are not necessarily suitable for all types of security personnel. For example, visibly camouflaged uniforms are generally regarded as unsuitable for general use by police forces, whose normal uniform is generally a visually solid colour, such as green, brown, blue or black.

GB-1 605 261-A (Secretary of State for Defense) discloses a combined infra-red and visible light camouflage system in which the infra-red camouflage does not detract from the visible light camouflage. Further, the infra-red camouflage is selected to provide low emissivity and high reflectivity such that the object to be camouflaged will not be a strong emitter of radiation. The camouflage system may be provided by painting a visible light transparent binder carrying infra-red reflector material onto an object which has already been painted with conventional visible pigments.

GB-2 001 417-A (Continental Gummiwerke Aktiengesellschaft) discloses a tarpaulin in which the outer layer has regions of varying infra-red reflectivity to provide an infra-red visible camouflage pattern.

It is an object of the present invention to provide a fabric wherein the camouflage pattern is only discernable under infra-red radiation.

SUMMARY OF THE INVENTION

Thus, the present invention provides a fabric which comprises a camouflage pattern, the pattern being invisible under visible light but visible under infra-red light.

Generally, the fabric appears under visible light to have a continuous solid colour. This is usually a dark colour, but could be a light colour, provided that any of the infra-red camouflage which is apparent is filled in with a compensatory visible but infra-red invisible pattern. However, the fabric may be printed with a non-camouflage pattern visible in the visible region of the spectrum.

According to the present invention a fabric can be printed with a camouflage pattern which is visible only in the infra-red region but is invisible in the visible region. Generally, the fabric is printed with an infra-red absorbing material, such as carbon black, a chitin resin or other known infra-red absorbing pigment. Generally, the infra-red region of interest lies in the range 1000 to 1200 nm.

The overall infra-red reflectivity of the fabric will be arranged to match that of the surroundings in which it is to be used. For example, for use in temperate foliage (i.e. countryside and woodland in one of the temperate regions of the world) the overall infra-red reflectivity required is typically 35%. This figure may rise to 70% in desert conditions. Other values may be chosen for snow or urban conditions.

In order to achieve the chosen overall reflectivity, the camouflage pattern will comprise at least two areas of different infra-red reflectivity. These will generally differ by at least 5%, preferably at least 10%, or even at least 15% in reflectivity. In a particularly preferred embodiment, the camouflage pattern comprises three areas whose reflectivity differs by approximately 10%, for example 30%, 40% and 50%. The surface area of these areas of different reflectivity may be the same or may vary depending on the type of camouflage pattern required. Generally, the areas will have substantially equal surface areas.

The infra-red camouflage pattern will generally be printed onto the fabric before, but more usually after, the fabric has been dyed. Screen printing is a particularly preferred printing method. In order to provide waterproofness and breath ability, the fabric may be laminated to an inner layer formed of a suitable water-impermeable water-vapour-permeable fabric. Many such fabrics are known and these typically incorporate a polyurethane membrane or coating. A particularly preferred material is available under the Gore-Tex trademark (W. L. Gore & Associates) and comprises a porous expanded PTFE membrane coated with a water-vapour-permeable polyurethane coating.

The present invention will now be illustrated by way of example only.

EXAMPLE 1

A dark green fabric suitable for use by anti-terrorist police having an infra-red camouflage pattern (which was not discernable under visible light) was obtained as follows.

A plain weave nylon fabric of mass 80 g/m$^2$ and dyed green was obtained. This was screen printed with a carbon black-containing pigment paste, comprising a sodium alginate thickener buffered with sodium bicarbonate, in a camouflage pattern in an amount of approximately 3% by weight. The camouflage pattern comprised three areas of differing reflectivity, the areas being of substantially equal surface area. The fabric was then subjected to a fixing and washing cycle utilising conventional methods. First, it was steamed at 102° C. for 45 minutes to fix the pigment. Then, the fabric web was passed through a linear wash comprising five water baths, the first of which contained a small amount of wetting agent, and then twisted into a rope and subjected to a slap wash in water. Finally, the fabric was stentered (laid out flat and held in place to prevent wrinkling) and dried. The extent of the washing process is selected to result in the removal of a substantial amount of the overprinted carbon pigment (for example, removal of at least 90% by weight). The small quantity of carbon remaining was invisible under visible light.

The camouflage fabric was then laminated in known manner, using an intermittent pattern of adhesive, to a Gore-Tex polyurethane coated porous expanded PTFE membrane having a knitted nylon tricot liner laminated on the inside thereof.

The infra-red reflectivity of the fabric was determined using a spectrophotometer fitted with a diffuse reflection attachment, working over the range 1000 to 1200 nm. This was calibrated using a reference standard of barium sulphate of minimum thickness 2 mm. The camouflage pattern comprised three areas of differing reflectance. The reflectance of each area was measured over the range 1000 to 1200 nm, integrated and averaged to provide an average reflectance figure. The infra-red reflectance for the three areas was found to be as follows:

I 30±10%

II 40±10%

III 50±10% the overall infra-red reflectance of the fabric was approximately 35%. Visually, the fabric presented a solid uniform green appearance and the infra-red camouflage pattern was indiscernible.

EXAMPLE 2

A black polyester fabric was treated in a similar manner to provide a fabric having an infra-red visible camouflage pattern. The only difference in processing compared to Example 1 described above was that the carbon black containing pigment paste comprised guar gum thickener, buffered with ammonium sulphate, and that the paste was fixed by heating with super-heated steam at 175° C. for eight minutes.

I claim:

1. A fabric which presents a non camouflage pattern under visible light and a camouflage pattern under infra-red radiation.

2. A fabric according to claim 1 wherein the fabric is uniformly coloured.

3. A fabric according to claim 1 wherein the camouflage pattern comprises at least two areas whose infra-red reflectance differ by at least 10%.

4. A fabric according to claim 1 whose average infra-red reflectance in the region 1000–1200 nm is 30–40%.

5. A fabric according to claim 1 wherein the camouflage pattern is applied by screen printing.

6. A fabric according to claim 1 which is provided with a waterproof water-vapour-permeable inner layer.

7. A fabric according to claim 1 wherein the fabric is a dark colour and the camouflage pattern is provided by carbon-containing material, the camouflage effect being provided by different concentrations of carbon in said material.

8. A fabric according to claim 1 wherein the reflectivity of the camouflage pattern is selected to match the reflectivity of selected surroundings.

9. A method of providing an infra-red visible camouflage pattern on a fabric, the method comprising the steps:

applying an infra-red absorbing material carried in a settable matrix to a fabric in a camouflage pattern;

setting the matrix;

treating the fabric to remove sufficient infra-red absorbing material such that the camouflage pattern is invisible under visible light.

10. The method of claim 9 wherein the infra-red absorbing material is carbon.

11. A method of camouflaging an object relative to selected surroundings, the method comprising providing a camouflaging covering material which carries a camouflage pattern, the pattern being invisible under visible light but visible under infra-red radiation, and wherein the reflectivity of the camouflage pattern is selected to match that of said selected surroundings.

12. The method of claim 11 for camouflaging an object relative to temperate foliage wherein the average reflectivity of the camouflage pattern is 35 to 45%.

13. A fabric appearing under visible light to have a continuous solid dark color suitable for use in police uniforms and appearing under infra-red radiation to have a camouflage pattern, the camouflage pattern being provided by carbon-containing material and the pattern being provided by areas of carbon-containing material having different concentrations of carbon, the carbon in said material being invisible under visible light.

* * * * *